(12) United States Patent
Kashiwaba et al.

(10) Patent No.: US 6,847,785 B2
(45) Date of Patent: Jan. 25, 2005

(54) CAMERA SYSTEM, CAMERA AND LENS APPARATUS

(75) Inventors: Seiichi Kashiwaba, Tochigi (JP); Toru Kawai, Kanagawa (JP); Masanori Ishikawa, Tokyo (JP); Shigeki Sato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/664,752

(22) Filed: Sep. 18, 2003

(65) Prior Publication Data
US 2004/0057714 A1 Mar. 25, 2004

(30) Foreign Application Priority Data
Sep. 20, 2002 (JP) ........................................ 2002-276283

(51) Int. Cl.[7] .............................................. G03B 13/36
(52) U.S. Cl. ........................................ 396/135; 348/345
(58) Field of Search ................................. 396/133, 135, 396/136; 348/345; 250/201.2

(56) References Cited

U.S. PATENT DOCUMENTS 4,977,457 A * 12/1990 Tamekuni et al. .......... 348/348

FOREIGN PATENT DOCUMENTS

JP 04-010051 1/1992 ........... G06F/15/16

* cited by examiner

Primary Examiner—W. B. Perkey
(74) Attorney, Agent, or Firm—Morgan & Finnegan, LLP

(57) ABSTRACT

A camera system which controls the driving of a focus lens through overlap control with a high degree of accuracy, is disclosed. The camera system comprises a lens apparatus with an image-taking optical system and a camera on which the lens apparatus is mountable. The camera system comprises a focus detection unit detecting a focusing state of the image-taking optical system, a driving unit driving the focus lens unit, and a controller controlling the driving speed of the focus lens unit and controls the focus detection unit to perform a focus detection operation at least once while the focus lens unit is moved. The controller sets the driving speed of the focus lens unit at the time of at least a final focus detection operation while it is moved toward an in-focus position, to a speed decelerated from the driving speed before the final focus detection operation.

4 Claims, 6 Drawing Sheets

CAMERA SYSTEM, CAMERA AND LENS APPARATUS

BACKGROUND OF THE INVENTION

1. Field of the Invention

The present invention relates to a lens apparatus, camera system and camera provided with an autofocusing function.

2. Description of the Related Art

There are many camera systems provided with an autofocusing (AF) function which detects a focusing state of an image-taking optical system using a focus detection sensor and moves a focus lens to an in-focus position using an actuator according to the detected signal. There are also a variety of autofocusing systems.

For example, a camera system which performs an AF operation based on a TTL phase difference detection system disclosed in Japanese Patent Publication No. H4 (1992)-10051, repeatedly performs focus detections not only before starting the driving of the focus lens but also during the driving of the focus lens, so-called overlap control, in order to shorten the time required to reach an in-focus state and moves the focus lens to the in-focus position while correcting the amount of driving of the focus lens based on the result.

However, with the trend toward implementation of an image-pickup element with a multitude of pixels and a smaller in size in a digital camera system in recent years, there is a growing demand for an AF function with a higher degree of accuracy and the above described AF has problems as shown below.

For example, in a system which corrects an amount of driving of the focus lens while carrying out overlap control, what determines the accuracy of stopping at an in-focus position finally is the final focus detection operation and correction of the amount of driving of the focus lens which are carried out immediately before the driving of the focus lens is completed. As the position of the focus lens at this time becomes closer to the in-focus position, it is possible to reduce errors in focus detection due to influences of aberration variations, etc., and calculation errors in the amount of driving due to variations in focus sensitivity (amount of movement of a focal point with respect to a unit amount of movement of the lens) and thereby improve the accuracy.

According to the AF system disclosed in the above described Publication, the focus detection operation during the driving of the focus lens is carried out at constant intervals, and therefore the position of the focus lens when the focus detection operation is carried out immediately before the driving is completed changes according to the amount of driving of the focus lens based on the initial focus detection operation, resulting in a problem that the accuracy of focus detection and accuracy of calculations of the amount of driving of the lens are not stable.

Furthermore, in a recent camera system capable of faster driving of the focus lens in order to reduce the focusing time, there are problems such as deterioration of focus detection accuracy due to an image flow on a focus detection sensor caused by the driving of the focus lens and deterioration of accuracy of focus detection and accuracy of calculations of the mount of driving where the focus detection operation immediately before the driving is completed is considerably far from the in-focus position.

SUMMARY OF THE INVENTION

It is an object of the present invention to provide a camera system, camera and lens apparatus capable of controlling the driving of a focus lens in an AF function which carries out overlap control to an in-focus position with a high degree of accuracy.

In order to attain the above described object, one aspect of the camera system of the present invention includes a camera system comprising a lens apparatus with an image-taking optical system including a focus lens unit and a camera on which the lens apparatus is mountable. The camera system comprises a focus detection unit which detects a focusing state of the image-taking optical system, a driving unit which drives the focus lens unit, and a controller which controls the driving speed of the focus lens unit through the driving unit and controls the focus detection unit to perform a focus detection operation at least once while the focus lens unit is moved. The controller sets the driving speed of the focus lens unit at the time of at least a final focus detection operation by the focus detection unit while the focus lens is moved toward an in-focus position, to a speed decelerated from the driving speed before the final focus detection operation.

One aspect of the camera of the present invention on which a lens apparatus is mountable, the lens apparatus comprising an image-taking optical system which includes a focus lens unit. The camera comprises a communication unit which communicates with the lens apparatus, a focus detection unit which detects a focusing state of the image-taking optical system, a driving unit which drives the focus lens unit, and a controller which controls the driving speed of the focus lens unit through the driving unit and through communications with the lens apparatus through the communication unit and controls the focus detection unit to perform a focus detection operation at least once while the focus lens unit is moved. The controller sets the driving speed of the focus lens unit at the time of at least the final focus detection operation by the focus detection unit while the focus lens unit is moved toward an in-focus position, to a speed decelerated from the driving speed before the final focus detection operation.

One aspect of the camera of the present invention comprises an image-taking optical system including a focus lens unit, a focus detection unit which detects the focusing state of the image-taking optical system, a driving unit which drives the focus lens unit, and a controller which controls the driving speed of the focus lens unit through the driving unit and controls the focus detection unit to perform a focus detection operation at least once while the focus lens unit is moved. The controller sets the driving speed of the focus lens unit at the time of at least the final focus detection operation by the focus detection unit while the focus lens is moved toward in-focus position, to a speed decelerated from the driving speed before the final focus detection operation.

One aspect of the lens apparatus of the present invention which is mountable to a camera detecting at least once the focusing state of the image-taking optical system through a focus detection unit while the focus lens unit is moved. The lens apparatus comprises an image-taking optical system including the focus lens unit, a driving unit which drives the focus lens unit, and a controller which controls the driving speed of the focus lens unit through the driving unit. The controller sets the driving speed of the focus lens unit at the time of at least the final focus detection operation by the focus detection unit while the focus lens unit moves to an in-focus position, to a speed decelerated from the driving speed before the final focus detection operation.

A detailed configuration of the camera system, camera and lens apparatus of the invention, the above and other objects and features of the invention will be apparent from the embodiments, described below.

DETAILED DESCRIPTION OF THE PREFERRED EMBODIMENTS

With reference now to the drawings, embodiments of the present invention will be explained below.

(Embodiment 1)

Figure 1:
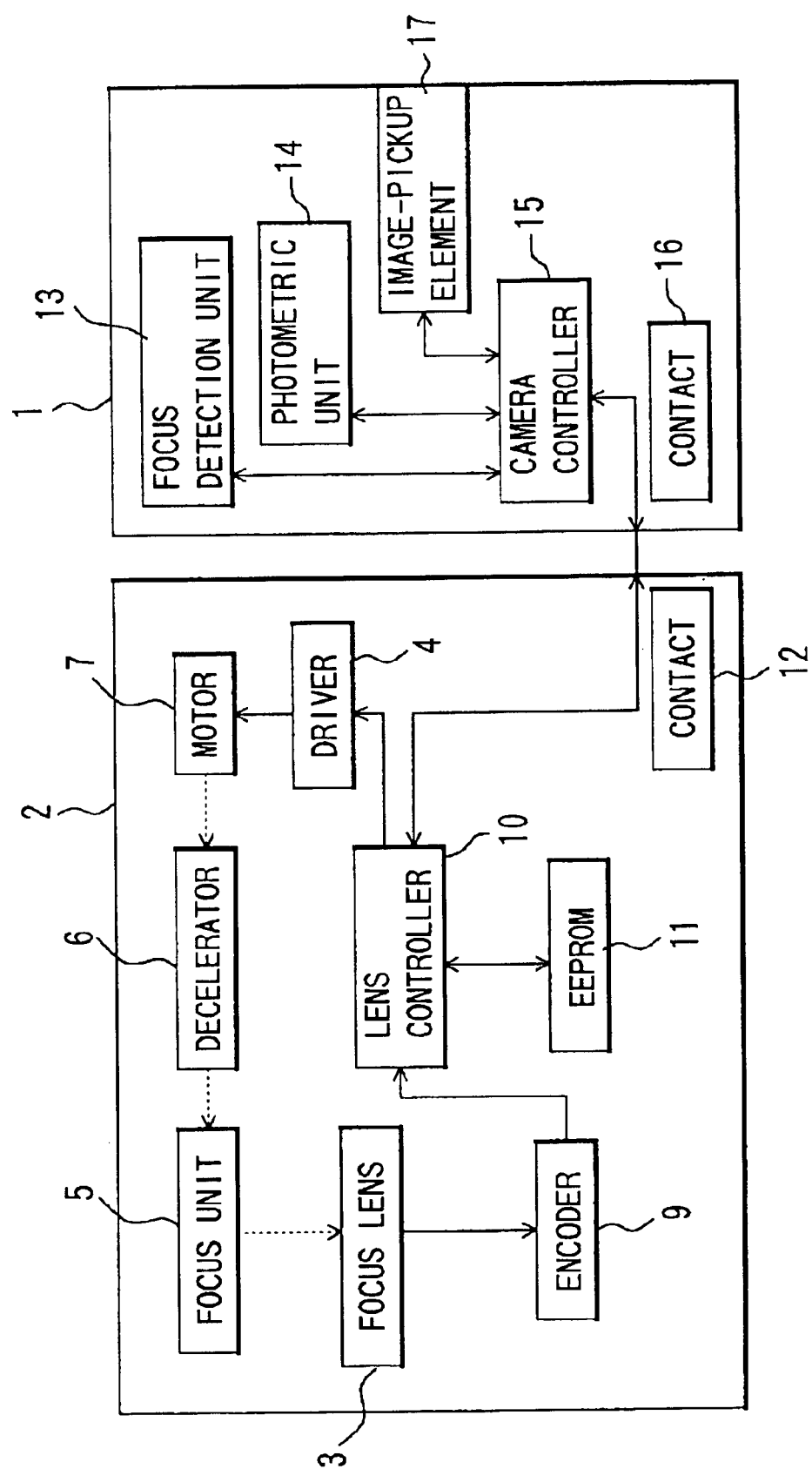
FIG. 1 is a block diagram of a camera system according to Embodiment 1.

FIG. 1 shows a structure of a lens interchangeable type camera system according to Embodiment 1. In FIG. 1, reference numeral 1 denotes a camera (digital still camera), 2 denotes an image-taking lens (lens apparatus) which is attached to the camera 1. In FIG. 1, dotted lines express mechanical connections and solid lines express electrical connections.

First, the structure of the image-taking lens 2 will be explained. Reference numeral 7 denotes a motor which is the power source to generate a driving force for the focus lens 3 which moves for focusing, 6 denotes a decelerator which decelerates the output of the motor 7 and increases torque, 5 denotes a focusing unit including a cam cylinder, etc., which converts the output from the decelerator 7 to a driving force in the direction of the optical axis of the focus lens 3.

Reference numeral 10 denotes a lens controller which controls all units in the image-taking lens 2, which consists of a microcomputer. Reference numeral 11 denotes an EEPROM which is an electrically erasable storage element and stores various historical data and various data about the image-taking lens 2 obtained through communications with the lens controller 10.

Reference numeral 4 denotes a driver circuit which gives driving power from the lens controller 10 to the motor 7, 9 denotes an encoder unit which outputs a signal (pulse signal) according to the movement of the focus lens 3 which is driven by the motor 7 through the decelerator 6 and focusing unit 5. This encoder unit 9 may also detect an amount of rotation of the motor 7.

Reference numeral 12 denotes a lens contact unit as a communication unit with a contact for the lens controller 10 to communicate with the camera 1.

Then, the structure of the camera 1 will be explained. Reference numeral 15 denotes a camera controller which performs overall control of the camera 1 and camera system, which consists of a microcomputer.

Reference numeral 13 denotes a focus detection unit which detects an amount of focal shift with respect to an object of the image-taking optical system in the image-taking lens 1 in response to a command from the camera controller 15. Based on the detection result from this focus detection unit 13, the camera controller 15 and lens controller 10, that is, camera system controlling means perform processing and control related to AF operation.

Reference numeral 14 denotes a photometric unit which measures brightness of an object according to a command from the camera controller 15 and 16 denotes a camera contact unit as a communication unit for the controller 15 to communicate with the lens controller 10. When the image-taking lens 2 is mounted in the camera 1, the camera contact unit 16 has electrical contact with the lens contact unit 12, the communication between the camera controller 15 and lens controller 10 is enabled and allowing power supplied from the camera 1 side to the lens 2 side is enabled.

Reference numeral 17 denotes an image-pickup element made up of a CCD or CMOS sensor, etc., which photoelectrically converts an image of an object formed by the image-taking optical system of the image-taking lens 2 and outputs an image signal. The image signal output from the image-pickup element 17 is subjected to image processing by an image processing circuit (not shown) and recorded in a recording medium (not shown) (semiconductor memory, magnetic disk, optical disk, etc.).

Figure 2:
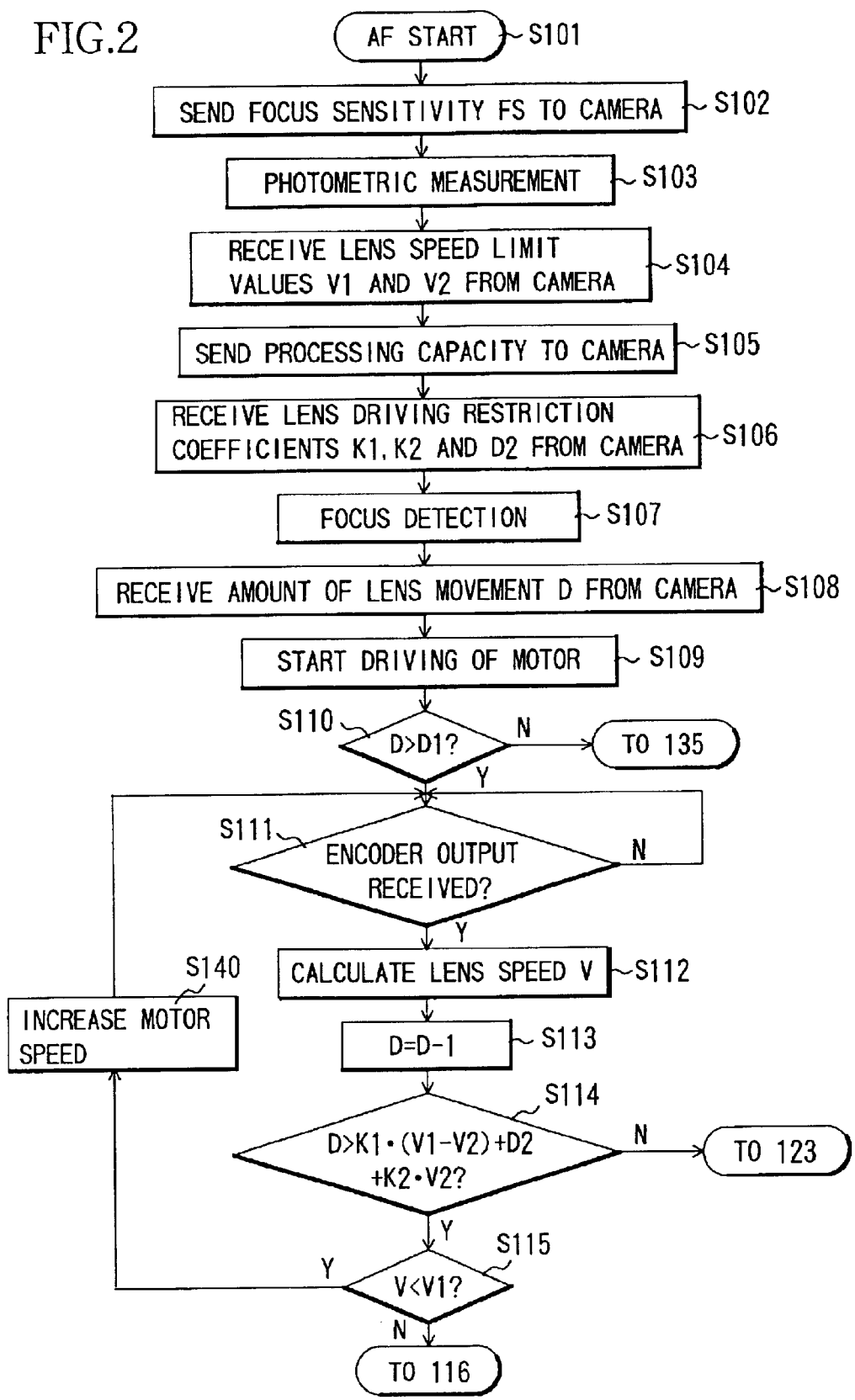
FIG. 2 is a flow chart showing an AF operation of the camera system according to Embodiment 1.
Figure 3:
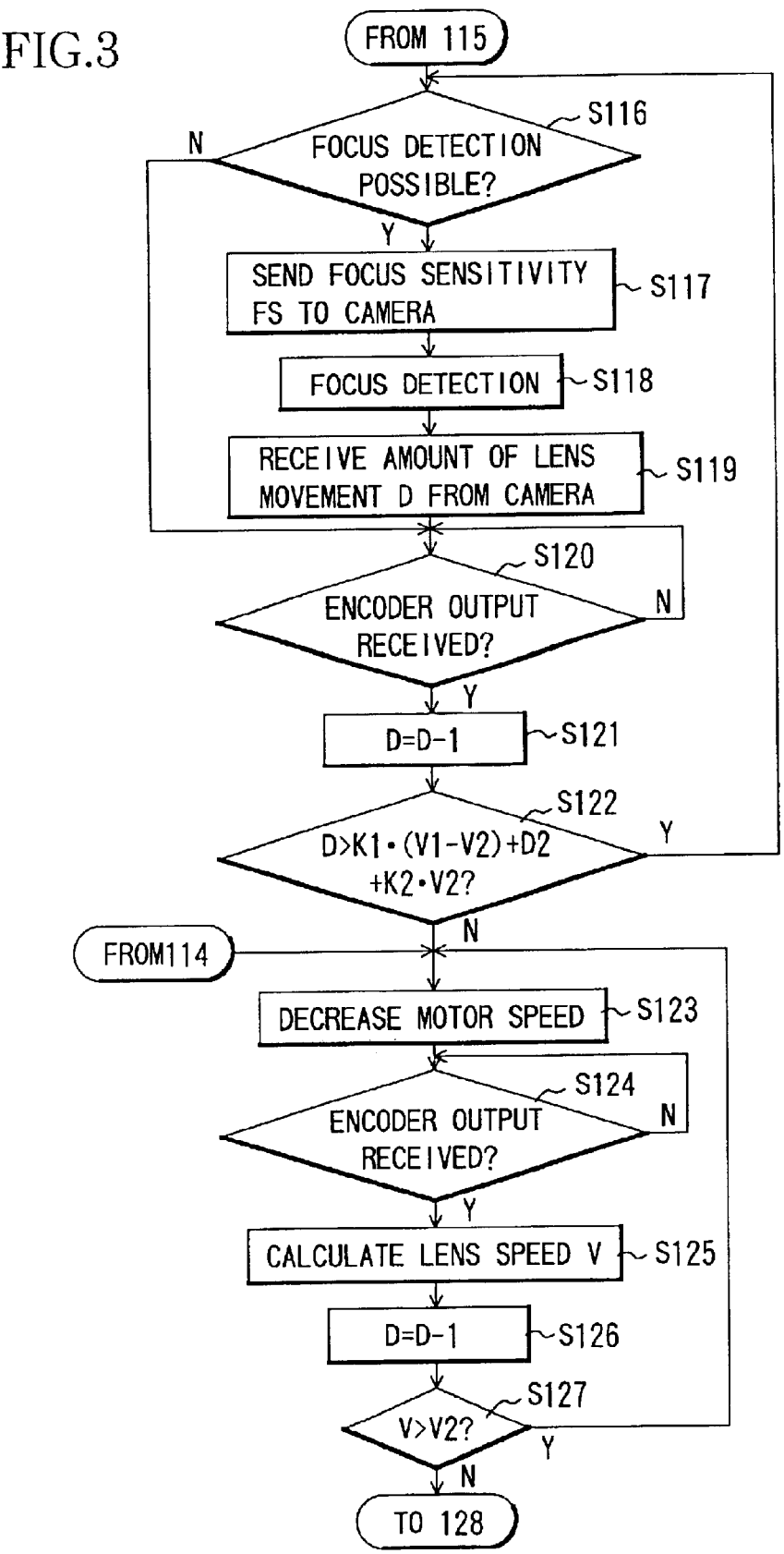
FIG. 3 is a flow chart showing an AF operation of the camera system according to Embodiment 1.
Figure 4:
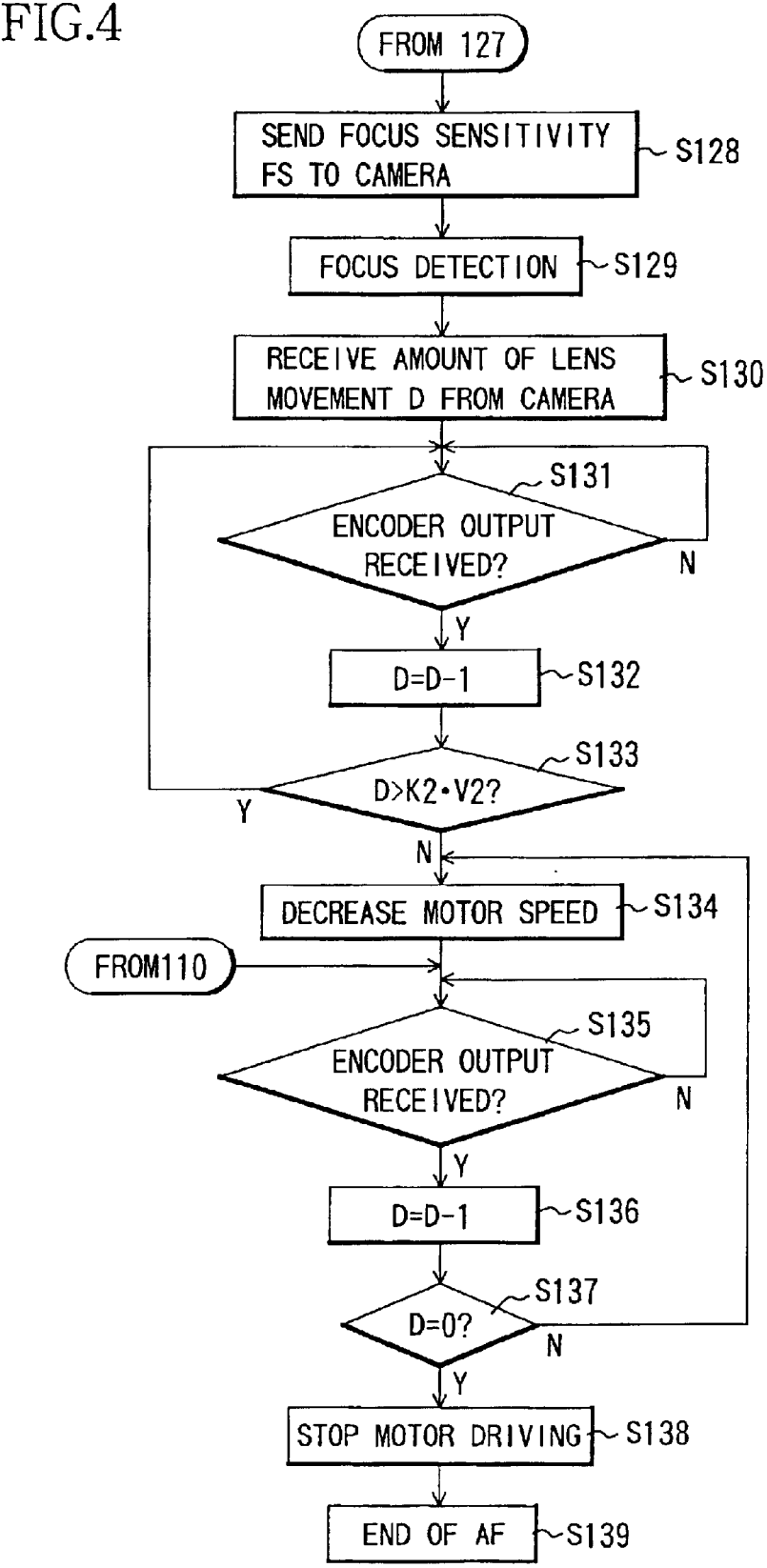
FIG. 4 is a flow chart showing an AF operation of the camera system according to Embodiment 1.

Then, the autofocusing operation of the camera system of this embodiment will be explained using the flow charts shown in FIGS. 2 to 4. For ease of understanding of explanation here, the operations of the camera controller 1 and lens controller 10 are shown in a series of flow charts, but the camera controller 1 and the lens controller 10 have different operation programs.

In step (denoted as "S" in the figure) 101, when the camera controller 15 receives an ON signal from an image taking preparation switch (not shown) provided in the camera 1, the camera controller 15 starts an AF operation in response thereto.

First, in step 102, the camera controller 15 sends a command to the lens controller 10 requesting data of focus sensitivity (amount of movement of the focus with respect to a unit amount of movement of the focus lens 3) FS. In response to this command, the lens controller 10 reads the value of the focus sensitivity FS corresponding to the current position of the focus lens 3 detected by a lens position detector (not shown) from the data stored in the EEPROM 11 and sends the value of the focus sensitivity FS to the camera controller 15.

In step 103, the camera controller 15 sends a command to the photometric unit 14 to perform a photometric operation. Furthermore, the camera controller 15 sends a command to the lens controller 10 requesting optical data necessary to calculate an exposure time of the image-pickup element 17 stored in the EEPROM 11. In response to this command, the lens controller 10 sends the optical data to the camera controller 15. The camera controller 15 calculates an exposure control value during the exposure of the image-pickup element 17 and lens movement speed limit values V1 and V2 used for the driving of the focus lens 3 based on the photometric result, the focus sensitivity FS, and optical data received from the lens 2.

The lens movement speed limit value V1 is a maximum speed as the lens speed and at least one focus detection is performed for overlap control during constant-speed driving at this maximum speed. On the other hand, the lens movement speed limit value V2 is a lens speed when the speed is kept constant after it is decelerated from the maximum speed and at least the final focus detection is performed for overlap control during this constant-speed driving after deceleration.

When the encoder unit 9 outputs a pulse signal according to the rotation of the motor 7, the rotation speed of the motor 7 is handled as the moving speed of the focus lens 3 in this embodiment.

Then, in step 104, the camera controller 15 sends the calculated lens speed limit values V1 and V2 to the lens controller 10.

Then, in step 105, the lens controller 10 sends information relating to the information processing capacity such as an operating frequency of the lens controller 10 to the camera controller 15.

Then, in step 106, the camera controller 15 calculates lens driving restriction coefficients K1, K2 and D2 based on the output of the photometric unit 14 and the information processing capacity of the lens controller 10 sent from the lens controller 10 and sends them to the lens controller 10. The lens driving restriction coefficients K1 and K2 are deceleration ratios for decelerating the lens speed and the lens driving restriction coefficient D2 indicates a lens driving distance to make the lens speed constant for the final focus detection of overlap control.

Then, in step 107, the camera controller 15 sends a command to the focus detection unit 13 to start a focus detection operation. Then, the camera controller 15 sends a command to the lens controller 10 requesting the optical data necessary to calculate an amount of movement of the focus lens 3 (or amount of driving of the motor 7) which is stored in the EEPROM 11. The lens controller 10 sends the above described optical data to the camera controller 15 according to this command.

The camera controller 15 calculates an amount of movement D of the focus lens 3 necessary to achieve focusing on the object based on the output of the focus detection unit 13 and the optical data sent from the lens controller 10.

Then, in step 108, the camera controller 15 sends the calculated amount of movement D to the lens controller 10. Then, in step 109, the lens controller 10 supplies power to the motor 7 through the driver circuit 4 based on the transmitted amount of movement D and moves the focus lens 3.

Here, in step 110, the lens controller 10 compares the calculated amount of movement D with a minimum value D1 (=K2·V2) with which it is possible to perform acceleration control of the focus lens 3. When the calculated amount of movement D is greater than D1, the process progresses to step 111 and when it is smaller, the process progresses on to step 135.

In step 111, the lens controller 10 decides whether the output from the encoder unit 9 has changed or not (whether the focus lens 3 is driving or not) and when the lens controller 10 confirms a change of the output, the process progresses to step 112.

In step 112, the lens controller 10 calculates a moving speed V of the focus lens 3 based on the cycle of the pulse signal output from the encoder unit 9.

Then, in step 113, the lens controller 10 subtracts 1 from the amount of movement of the focus lens 3 and regards this value as D.

Then, in step 114, the lens controller 10 compares the calculated amount of movement D with the value of K1·(V1−V2)+D2+K2·V2. When the calculated amount of movement D is greater than D1, the process progresses to step 115 and when it is smaller than D1, the process progresses to step 123.

In step 115, the lens controller 10 compares the moving speed V with the moving speed limit value V1. When the moving speed V is smaller than V1, the process progresses to step 140 where the lens controller 10 increases the motor speed by a predetermined amount and the process back to step 111. When the moving speed V is greater than V1, the process progresses to step 116.

Then, in step 116, the camera controller 15 decides whether it is possible to perform a focus detection operation judging from the communication with the lens controller 10 and the situation of the reset operation, etc., of the focus detection unit 13 or not and if the focus detection operation is possible, the process progresses to step 117 and if not possible, the process progresses to step 120.

In step 117, the camera controller 15 sends a command to the lens controller 10 requesting the data of the focus sensitivity FS. In response to this command, the lens controller 10 reads the value of the focus sensitivity FS corresponding to the current position of the focus lens 3 from the data stored in the EEPROM 11 and sends the value of the focus sensitivity FS to the camera controller 15.

Then, in step 118, the camera controller 15 sends a command to the focus detection unit 13 to carry out a focus detection operation. Then, the camera controller 15 sends a command to the lens controller 10 requesting the optical data stored in the EEPROM 11. In response to this command, the lens controller 10 sends the optical data stored in the EEPROM 11 to the camera controller 15.

The camera controller 15 calculates an amount of movement D of the focus lens 3 based on the output of the focus detection unit 13, the value of the focus sensitivity FS sent from the lens controller 10 in step 117 and step 118 and the optical data.

Then, in step 119, the camera controller 15 sends the calculated amount of movement D to the lens controller 10.

Then, in step 120, the lens controller 10 decides whether the output of the encoder unit 9 has changed or not and when the lens controller 10 confirms some change of the output, the process progresses to step 121.

In step 121, the lens controller 10 subtracts 1 from the calculated amount of movement D of the focus lens 3 and regards this value as a new D.

Then, in step 122, the lens controller 10 compares the calculated amount of movement D with K1·(V1−V2)+D2+K2·V2. When the amount of movement D is greater than D1, the process progresses to step 116. When the amount of movement D is smaller than D1, the process progresses to step 123 and decreases the motor speed by a predetermined amount.

In step 124, the lens controller 10 detects whether the output of the encoder unit 9 has changed or not and when it confirms some change of the output, the process progresses to step 125. In step 125, the lens controller 10 calculates the moving speed V of the focus lens 3 based on the cycle of the pulse signal output from the encoder unit 9.

Then, in step 126, the lens controller 10 subtracts 1 from the amount of movement D of the focus lens 3 and regards this value as a new D. In step 127, the lens controller 10 compares the moving speed V with the moving speed restriction V2 and when the moving speed V is smaller than V2, the process progresses to step 128 and when it is greater, the process progresses to step 123.

In step 128, the camera controller 15 sends a command to the lens controller 10 requesting the data of the focus sensitivity FS. In response to this command, the lens controller 10 reads the value of the focus sensitivity FS corresponding to the current position of the focus lens 3 from the data stored in the EEPROM 11 and sends the value of the focus sensitivity FS to the camera controller 15.

In step 129, the camera controller 15 sends a command to the focus detection unit 13 to perform a focus detection operation. Then, the camera controller 15 sends a command to the lens controller 10 requesting it to send the optical data stored in the EEPROM 11. In response to this command, the lens controller 10 sends the optical data stored in the EEPROM 11 to the camera controller 15.

The camera controller 15 calculates the amount of movement D of the focus lens 3 based on the output of the focus detection unit 13, the value of the focus sensitivity FS sent from the lens controller 10 in step 128 and step 129 and optical data.

Then, in step 130, the camera controller 15 sends the calculated amount of movement D to the lens controller 10.

Then, in step 131, the lens controller 10 decides whether the output of the encoder unit 9 has changed or not and when some change of the output is confirmed, the process progresses to step 131.

In step 132, the lens controller 10 subtracts 1 from the calculated amount of movement D of the focus lens 3 and regards this value as a new D.

Then, in step 133, the lens controller 10 compares the calculated amount of movement D with K2·V2. When the amount of movement D is greater than K2·V2, the process progresses to step 131. When the amount of movement D is smaller than K2·V2, the process progresses to step 134 and decreases the motor speed by a predetermined amount.

In step 135, the lens controller 10 detects whether the output of the encoder unit 9 has changed or not, and when some change of the output is confirmed, the process progresses to step 136. In step 136, the lens controller 10 calculates the moving speed V of the focus lens 3 based on the cycle of the pulse signal output from the encoder unit 9.

Then, in step 136, the lens controller 10 subtracts 1 from the amount of movement D of the focus lens 3 and regards this value as a new D. Then, in step 137, the lens controller 10 decides whether the amount of movement D has become 0 or not and when it is 0, the lens controller 10 moves on to step 138 and when the amount of movement D is not 0, the process progresses to step 134.

In step 138, the lens controller 10 terminates the driving of the focus lens 3 and stops the power supply to the motor 7. Then, the lens controller 10 sends information on the termination of the driving of the focus lens 3 to the camera controller 15 and terminates the AF operation.

Figure 5:
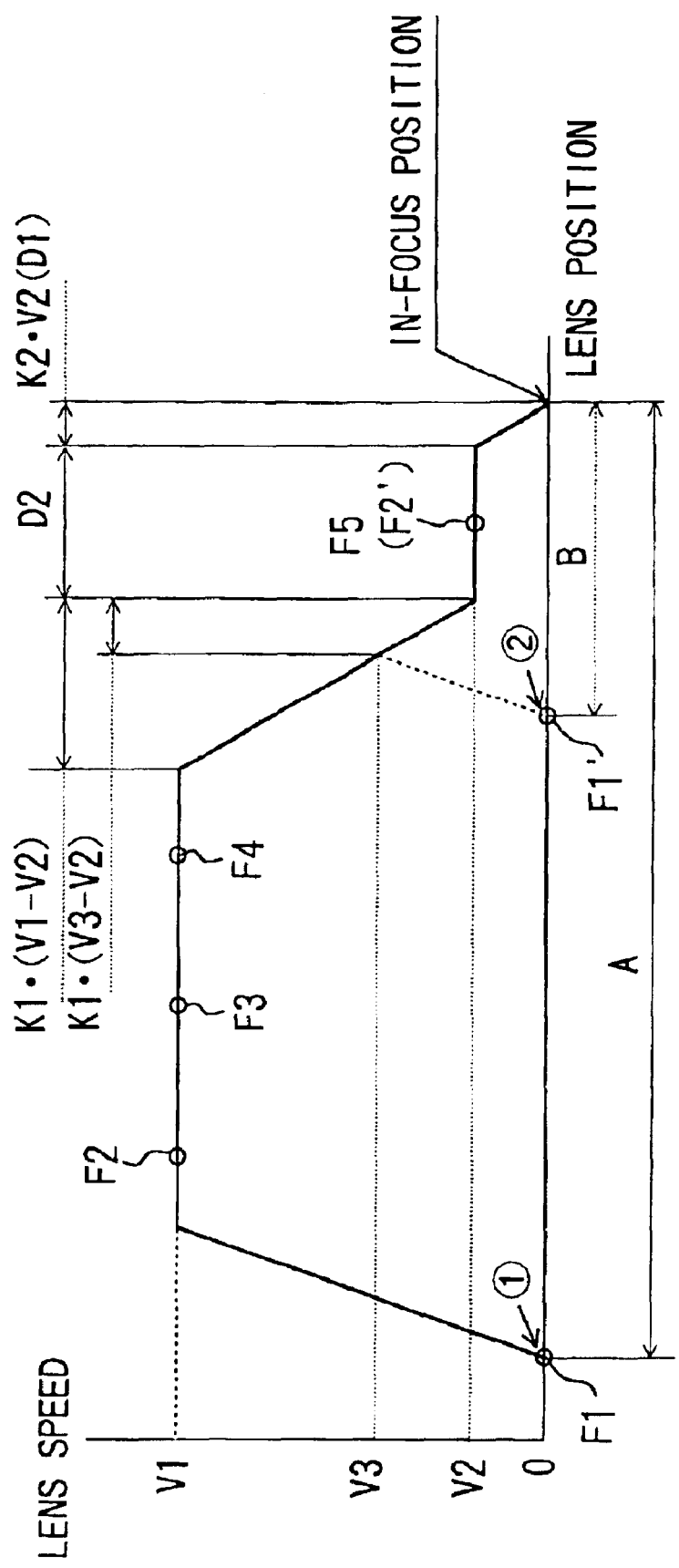
FIG. 5 illustrates an operation of the camera system according to Embodiment 1 showing a relationship between its overlap control and lens speed.

FIG. 5 shows the relationship between the position and speed of the focus lens 3 during AF control in a graph according to the above described flow chart. The horizontal axis shows the position of the focus lens 3 and the vertical axis shows the moving speed of the focus lens 3. Furthermore, on the graph shows points at which a focus detection operation is performed.

First, when the start of an AF operation is indicated at position (1), the initial focus detection operation F1 is performed, driving control of the focus lens 3 is started based on the amount of movement D until an in-focus position calculated based on the result (steps 101 to 109). Then, the speed of the focus lens 3 (lens speed) is accelerated to V1 (steps 111 to 115). Here, the amount of movement D is a value containing errors with respect to the amount of movement A up to the true in-focus position.

When the lens speed reaches V1, the lens speed is controlled so that the lens is driven at the constant speed V1 and a focus detection operation is repeated as many times as possible in this constant speed driving state (three times F2 to F4 in FIG. 5) and the driving of the lens is controlled while updating (correcting) the remaining amount of movement D up to the in-focus position (steps 116 to 122).

Then, after the remaining amount of movement D up to the in-focus position becomes K1·(V1−V2)+D2+K2·V2, the lens speed is decelerated down to V2 and the final focus detection operation F5 is carried out in a constant speed driving state at the lens speed V2 (steps 128 to 133). The final remaining amount of movement D up to the in-focus position is calculated based on the detection result at this time and the point at which deceleration is started toward the stop position is determined.

Then, after the remaining amount of movement D becomes K2·V2, the lens speed is decelerated and when the remaining amount of movement D becomes 0, the driving of the lens is completed (steps 134 to 139).

The above described flow chart applies to a case where the amount of lens movement D calculated first is an amount of movement allowing the lens speed to be accelerated to V1, but a flow chart applicable to the case where the amount of lens movement D is smaller than that, unable to accelerate the lens speed to V1 will be omitted. However, such an operation can be as follows, for example:

When the start of an AF operation is indicated at the lens position (2), an initial focus detection operation F1' is carried out and the driving control of the focus lens 3 is started based on the amount of movement D up to the in-focus position calculated based on the result. Then, the lens speed is accelerated. Here, the amount of movement D is a value containing errors with respect to the amount of movement B up to the true in-focus position.

Deceleration is performed after the lens speed V3 is reached at which the remaining amount of movement D up to the in-focus position becomes K1·(V3−V2)+D2+K2·V2 until the lens speed reaches V2 and a final focus detection operation F2' is carried out in a constant speed driving state at the lens speed V2. Then, based on the detection result at this time, the final remaining amount of movement D up to the in-focus position is calculated and the point at which deceleration toward a stop position is started is determined.

Then, after the remaining amount of movement D becomes K2·V2, the lens speed is decelerated and when the remaining amount of movement D becomes 0, the driving of the lens is terminated.

First, according to the camera system of Embodiment 1, through a focus detection operation which is carried out repeatedly during the driving of the focus lens 3 and operations for correcting the amount of driving of the focus lens 3, the final focus detection operation for determining the accuracy of final stoppage at the in-focus position, which is carried out immediately before the driving is completed, and the operation for correcting the amount of driving of the focus lens 3 are carried out after the moving speed of the focus lens 3 is decelerated down to a predetermined speed at predetermined timing, and in this way it is possible to reduce the amount of movement of the focus lens 3 necessary for stop control and bring the position of the focus lens 3 at this time closer to the in-focus position compared to the conventional system. Thus, it is possible to reduce focus detection errors due to influences of aberration variations, etc., up to the in-focus position and errors in calculating the amount of driving due to variations of focus sensitivity, etc., and exclude image flows on the focus detection sensor caused by the movement of the focus lens 3 which may cause deterioration of the focus detection accuracy as much as possible to improve the focusing accuracy.

Second, the speed of the focus lens 3 is decelerated down to a predetermined speed based on at least brightness of the object and the value of focus sensitivity, and it is thereby possible to keep the image flow on the focus detection sensor within a light storage time substantially constant even when the image-taking conditions are changed and always keep the focusing accuracy stable.

Third, by decelerating the focus lens 3 at a predetermined timing based on the current moving speed and a constant speed after deceleration, it is possible to provide a minimum necessary predetermined speed area according to the time required for deceleration and ensure stable focusing accuracy through a short-time operation.

Fourth, by correcting the deceleration timing of the focus lens 3 according to at least the information processing capacity of the lens controller 10, it is possible to perform a focus detection operation and an operation of correcting the amount of driving of the focus lens 3 in a predetermined speed area reliably irrespective of the operating condition and always make the focusing accuracy stable.

In this embodiment, the motor 7 and decelerator 6 are provided inside the image-taking lens 2, but these can also be provided on the camera side.

Furthermore, this embodiment has described the case where the camera controller 15 and lens controller 10 are each assigned a portion of the processing related to speed control of the focus lens based on the detection result of the focus detection unit 13, but it is also possible to assign the whole processing related to speed control to either the camera controller or lens controller.

(Embodiment 2)

Above described Embodiment 1 has described the camera system allowing the mounting of the image-taking lens in the camera, but the present invention is also applicable to a lens-integral type camera.

Figure 6:
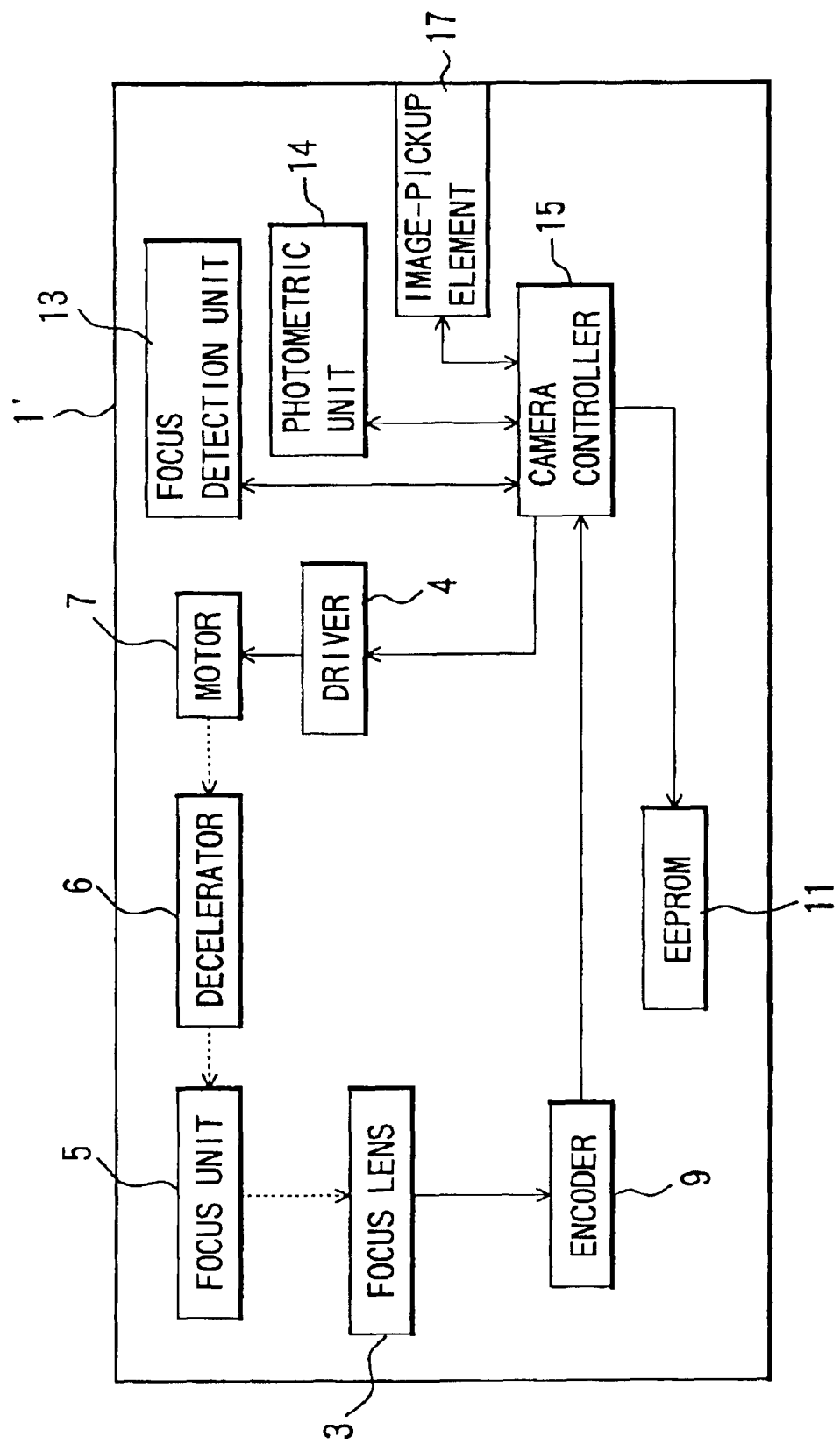
FIG. 6 is a block diagram of a camera according to Embodiment 2.

FIG. 6 shows a lens-integral type camera of Embodiment 2 of the present invention. In this camera 1', the same components as those in Embodiment 1 are assigned the same reference numerals as those in Embodiment 1.

In this case, the functions of the lens controller of Embodiment 1 are included in the camera controller 15 and the camera controller 15 performs overall control including the overlap control explained in Embodiment 1.

While preferred embodiments have been described, it is to be understood that modification and variation of the present invention may be made without departing from scope of the following claims.

What is claimed is:

1. A camera system comprising a lens apparatus with an image-taking optical system including a focus lens unit and a camera on which the lens apparatus is mountable, the camera system comprising:

a focus detection unit which detects a focusing state of the image-taking optical system;

a controller which controls the driving speed of the focus lens unit and controls the focus detection unit to perform a focus detection operation at least once while the focus lens unit is moved; and a photometric unit which measures the brightness of an object;

wherein the controller drives the focus lens unit at a first speed and a second speed lower than the first speed while the focus lens unit is moved toward an in-focus position, the focus detection unit performs a final focus detection operation out of at least one focus detection operation while the focus lens unit is driven at the second speed, before the focus lens unit reaches the in-focus position, and the controller determines the second speed based on the photometric result by the photometric unit and information on an amount of movement of a focal point of the image-taking optical system with respect to an amount of movement of the focus lens unit.

2. A camera on which a lens apparatus is mountable, the lens apparatus comprising an image-taking optical system which includes a focus lens unit, the camera comprising:

a communication unit which communicates with the lens apparatus;

a focus detection unit which detects a focusing state of the image-taking system;

a controller which controls the driving speed of the focus lens unit by communications with the lens apparatus through the communication unit and controls the focus detection unit to perform a focus detection operation at least once while the focus lens unit is moved; and a photometric unit which measures brightness of an object;

wherein the controller drives the focus lens unit at a first speed and a second speed lower than the first speed while the focus lens unit is moved toward an in-focus position, the focus detection unit performs a final focus detection operation out of at least one focus detection operation while the focus lens unit is driven at the second speed, before the focus lens unit reaches the in-focus position, and the controller determines the second speed based on the photometric result by the photometric unit and information on an amount of movement of a focal point of the image-taking optical system with respect to an amount of movement of the focus lens unit.

3. A camera comprising:

an image-taking optical system including a focus lens unit;

a focus detection unit which detects a focusing state of the image-taking optical system;

a controller which controls the driving speed of the focus lens unit and controls the focus detection unit to perform a focus detection operation at least once while the focus lens unit is moved; and a photometric unit which measures the brightness of an object;

wherein the controller drives the focus lens unit at a first speed and a second speed lower than the first speed while the focus lens unit is moved toward an in-focus position;

the focus lens detection unit performs a final focus detection operation out of at least one focus detection operation while the focus lens unit is driven at the second speed, before the focus lens unit reaches the in-focus position, and the controller determines the second speed based on the photometric result by the photometric unit and information on an amount of movement of a focal point of the image-taking optical system with respect to an amount of movement of the focus lens unit.

4. A lens apparatus which is mountable to a camera, comprising:

an image-taking optical system including a focus lens unit;

a controller which controls the driving speed of the focus lens unit; and a memory which stores information on an amount of movement of a focal point of the image-taking optical system with respect to an amount of movement of the focus lens unit, wherein the camera controls a focus detection unit to detect a focusing state of the image-taking optical system at least once while the focus lens is moved, the controller drives the focus lens unit at a first speed and a second speed lower than the first speed while the focus lens unit is moved toward an in-focus position, the focus detection unit performs a final focus detection operation out of at least one focus detection operation while the focus lens unit is driven at the second speed, before the focus lens unit reaches the in-focus position, and the controller drives the focus lens unit based on the second speed which the camera and the lens apparatus determine based on information which is stored in the memory and the photometric result of brightness of an object.

* * * * *